June 10, 1941.  F. KLAIBER  2,245,134
SYNCHRONIZED GENERATOR
Filed March 14, 1940
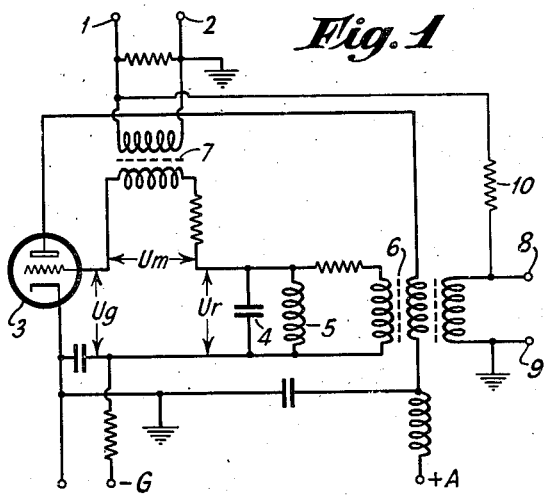
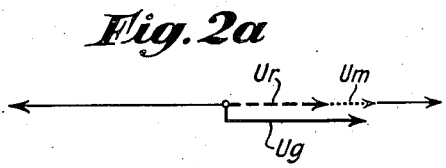
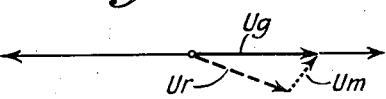
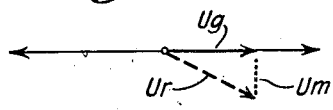
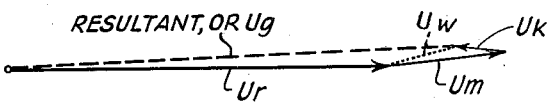
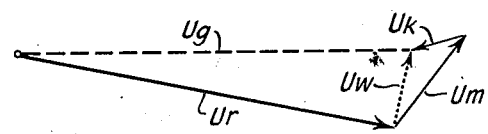
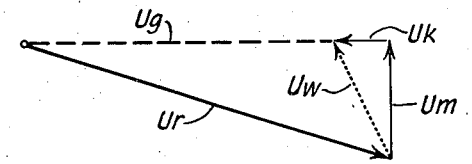
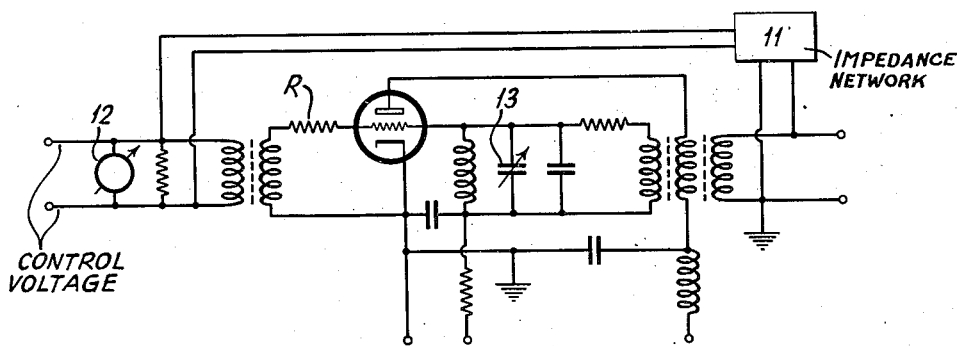
INVENTOR.
FRITZ KLAIBER
BY
ATTORNEY.

Patented June 10, 1941

2,245,134

UNITED STATES PATENT OFFICE 2,245,134

SYNCHRONIZED GENERATOR

Fritz Klaiber, Berlin, Germany, assignor to "Fides Gesellschaft für die Verwaltung und Verwertung von gewerblichen Schutzrechten mit beschränkter Haftung," Berlin, Germany, a corporation of Germany Application March 14, 1940, Serial No. 323,855
In Germany February 17, 1939

9 Claims. (Cl. 250—36)

The invention relates to an electric oscillation producer whose frequency is controlled by a foreign frequency.

It is known that generators which oscillate in a definite natural frequency, can be pulled along in a definite frequency range which is given by the circuit elements of the generator and by the value of the voltage and of the inner resistance of the foreign frequency, i. e., the pulled generator assumes in the pulling range the frequency of the pulling foreign generator. In an oscillation generator with electron tubes it is suited in general to impress upon the grid of the tube the controlling foreign frequency in order thereby to obtain a maximum influence upon the oscillation generator and therewith a wide pulling range. Furthermore, it is advisable in order to maintain as wide as possible the pulling range, other things being equal, to choose as small as possible the condenser of the oscillatory circuit which determines the natural frequency. The pulling range can furthermore be increased by imparting a high damping to the oscillatory circuit of the oscillation generator which circuit determines the natural frequency. In many cases, however, a high damping of the oscillatory circuit is not desirable, for instance where danger exists that the controlling foreign frequency may fail so that in this case the pulled generator has, as self excited generator, a very poor constancy of frequency. In many cases it is desirable that a pulled generator has a pulling range as wide as possible, so long as it is pulled by a foreign frequency, yet that it still has a sufficient stability of frequency upon failure of the control generator. Thus it often happens, for instance in carrier frequency stations, that a series of generators is controlled by a constant basic frequency, whereby the fact must be reckoned with that the controlling frequency may cease for a brief time period. In these cases it is important that the various generators which then oscillate by themselves continue to oscillate with as constant a frequency as possible until the control frequency appears again.

Therefore, the endeavor will be to design the elements which determine the natural frequency of the oscillatory circuit of the pulled generator in such manner that they are as free as possible from damping action. However, in this case the following disadvantage was encountered: The more the pulled generator is detuned in its natural frequency, the lower becomes the effective grid potential. Now, when rendering the amplitude of the controlled frequency larger, in order to thereby increase the pulling range, the effective grid potential assumes a very high value when the control frequency conforms with the natural frequency of the generator. The case may hereby occur that the grid of the pulled generator will then be controlled in excess, and this excessive control may have undesirable consequences.

In the pulled generator, according to the invention, an excessive control of the generator is avoided without the pulling range being thereby limited. This is accomplished in accordance with the present invention in that the amplitude of the control frequency applied to the oscillation generator is so varied that it has its lowest value when the natural frequency of the oscillation generator is in the proximity of the desired frequency and that is becomes higher when the natural frequency of the generator deviates from the desired frequency.

A better understanding of the invention may be had by referring to the following description which is accompanied by the drawing wherein Figs. 1 and 4 illustrate two embodiments of the present invention, and Figs. 2a, 2b, 2c, 3a, 3b and 3c are vector diagrams given to aid in an understanding of the invention.

In Fig. 1 a return-coupled generator is shown which can be pulled along by applying a control frequency to the terminals 1 and 2. The grid circuit of the oscillation vacuum tube 3 contains elements which determine the natural frequency and which consists of a condenser 4 and of a self inductance 5. The feed back from the plate circuit upon the grid circuit takes place across a transformer 6. The grid circuit contains a further transformer 7 whose primary side has the foreign frequency impressed thereon.

The vector diagrams shown in Figs. 2a, 2b and 2c show the values of the effective grid potentials $U_g$ for various cases. The voltage vector of the applied foreign potential is hereby designated by $U_m$ and the voltage vector of the feed back potential is designated by $U_r$. In general, the adding of a pulling foreign potential causes an increase of the effective grid potential $U_g$ which has the highest value when the natural frequency of the generator and the pulling frequency have the same value. This case is represented by Fig. 2a. The more the pulled generator is detuned in its natural frequency, the lower becomes the effective grid biasing potential $U_g$ since the vector of the return-coupled potential $U_r$ and the vector of the pulling potential $U_m$ will be displaced relative to each other in the manner indicated by Figs. 2b and 2c. In the case last represented, the pulled generator is still further detuned. In the limit case, the vector $U_m$ is at right angles to the vector $U_g$. At a further detuning of the generator the latter falls out of step. Hence, at the grid two alternating potentials having different frequencies are active which are continuously displaced in phase relative to each other. When the natural frequency of the generator conforms with the pulling frequency, the vector $U_g$ is thus particularly large so that it may cause an undesirable or unallowable excessive control of the pulled generator.

In accordance with the invention, the amplitude of the control frequency applied to the oscillation generator is so varied that it has its lowest value when the natural frequency of the generator lies in the proximity of the desired frequency, and that it becomes higher in value when the generator frequency deviates from the desired frequency. For influencing the amplitude of the control frequency applied to the oscillation generator, a potential may be employed which is derived from the output of the oscillation generator. For this purpose, there may be employed a counter-coupling circuit which can be established in a simple manner by means of a connection which extends from the output terminal 8 through a resistor 10 to the input terminal 1.

In Figs. 3a, 3b and 3c, vector diagrams for various cases are shown, whereby now from the output of the pulled generator a voltage $U_k$ is countercoupled upon the pulling input voltage to the pulled generator. When the natural frequency of the pulled generator conforms with the frequency of the pulling, the position of the vectors corresponds with the case shown in Fig. 3a. The vector $U_k$ here opposes $U_m$. Therefore, the potential appearing at the pulling input is lower than $U_m$ and has the value $U_w$. As soon as the pulled generator is detuned, the cases are obtained as shown by Figs. 3b and 3c. The resultant potential $U_w$ appearing at the pulling input therefore becomes higher. The case of Fig. 3c represents the limit case whose surpassing causes the pulled generator to fall out of step. The pulling range will not be decreased by the countercoupled potential $U_k$.

In the pulled generator shown in Fig. 4 the countercoupling takes place across a four pole device 11. This four pole device is an impedance network having a pair of terminals upon which voltage is impressed and another pair of terminals from which voltage is derived. There is arranged hereby in the pulling input a measuring instrument 12 with which the potential $U_w$ can be measured. The value of the resultant potential appearing at the pulling input can be given as a measure for the deviation of the natural frequency of the pulled generator from the pulling frequency. When the foreign frequency conforms with the natural frequency of the generator, the potential $U_w$ has its lowest value so that the measuring instrument 12 shows the smallest pointer deviation. Now, if the elements of the pulled generator which determine the frequency are variable, for instance through the use of a variable condenser 13 in the grid circuit, it is easily possible slightly to vary during the operation the frequency of the generator. In order to establish conformity between the natural frequency of the generator and the control frequency, the variable condenser 13 can hereby be moved until the measuring instrument 23 indicates the smallest deviation. In this case the frequencies conform with each other. The pulled generator has, as regards the usual pulled generators, the essential advantage that during operation a continuous control of the deviation of the natural frequency of the generator from the control frequency can take place without a severance of the pulling generator from the control frequency being required.

In order to prevent a reaction of the feed back potential upon the amplitude of the control frequency, circuit elements may be provided between the grid of the tube and the pulling input which have the effect that the potential supplied by the grid of the tube to the pulling input is low as compared with the foreign potential impressed upon the pulling input while the pulling foreign potential impressed upon the pulling input acts however, with substantially unchanged value upon the grid of the tube. This can be accomplished, for instance, in that a tube is arranged between the grid input and the oscillation generator. In many cases it is sufficient, however, if between the grid of the tube and the pulling input a resistor R is inserted which is large as compared with the inner resistance of the pulling voltage source.

By means of the voltmeter arranged in the grid input the deviation of the natural frequency of the generator from the control frequency can be observed at any time. It is immediately possible to arrange in place of a measuring instrument also other devices by means of which a subsequent frequency setting of the circuit elements which determine the frequency, such as for instance of the variable condenser 13 will be automatically carried out. Thus, for instance, relays or other devices which respond to voltage variations may be employed such that the natural frequency of the generator is brought continuously into conformity with the control frequency. Now, if the control frequency fails, the last frequency adjustment remains and the generator continues to oscillate with a non-reduced accuracy.

What is claimed is:

1. An oscillation generator comprising an electron discharge device having a cathode, an anode and a control electrode, an oscillatory circuit coupled between said control electrode and cathode, a feed-back circuit between said oscillatory circuit and said anode, a source of oscillations for controlling the frequency of said generator coupled to said control electrode and cathode, and means for varying the effective potential on said control electrode as a function of the frequency of oscillations produced by said generator.

2. An oscillation generator comprising an electron discharge device having a cathode, an anode and a control electrode, an oscillatory circuit coupled between said control electrode and cathode, a feed-back circuit between said oscillatory circuit and said anode, a source of constant frequency oscillations coupled to said control electrode and cathode, and means deriving a voltage from said oscillatory circuit and applying said voltage to said control electrode in such phase as to vary the value of the effective potential of said control electrode as a function of the frequency of oscillations of said generator.

3. An oscillation generator comprising an electron discharge device having an anode, a cathode and a grid, a parallel tuned oscillatory circuit coupled between said grid and cathode, a transformer one winding of which is coupled to said grid and cathode and another winding of which is coupled to a source of constant frequency oscillations, a feed back circuit between said anode and said tuned oscillatory circuit including an inductance coil inductively coupled to said tuned circuit, an output circuit for said generator, and connections extending from said output circuit to the last winding of said transformer for applying thereto a potential to control the effectiveness of said source of constant frequency oscillations.

4. An oscillation generator comprising an electron discharge device having an anode, a cathode and a grid, a parallel tuned oscillatory circuit coupled between said grid and cathode, a transformer one winding of which is coupled to said grid and cathode and another winding of which is coupled to a source of constant frequency oscillations, a feed back circuit between said anode and said tuned oscillatory circuit including an inductance coil inductively coupled to said tuned circuit, an output circuit for said generator, and a connection extending from one terminal of said output circuit to one terminal of the last mentioned winding of said transformer for applying thereto a potential to control the effectiveness of said source of constant frequency oscillations, said connection including a resistor.

5. An oscillation generator comprising an electron discharge device having an anode, a cathode and a grid, a parallel tuned oscillatory circuit coupled between said grid and cathode, a transformer one winding of which is coupled to said grid and cathode and another winding of which is coupled to a source of constant frequency oscillations, a feed back circuit between said anode and said tuned oscillatory circuit including an inductance coil inductively coupled to said tuned circuit, an output circuit for said generator, connections extending from said output circuit to the last winding of said transformer for applying thereto a potential to control the effectiveness of said source of constant frequency oscillations, and means for insuring that the value of said potential is low compared to the value of the potential impressed on said grid by said source of constant frequency oscillations and also that the value of said last potential is unvaried.

6. An oscillation generator in accordance with claim 5, characterized in this that said means comprises a resistor located between said grid and the first mentioned winding of said transformer.

7. The method of controlling the oscillation of an electron discharge device oscillator in accordance with a foreign voltage which comprises applying to said oscillator, as a controlling voltage, the vector difference between a voltage derived from said oscillator and a voltage derived from said foreign voltage, maintaining said vector difference a minimum when the oscillation of said oscillator bears a desired relation to said foreign voltage and increasing rapidly said vector difference with departure from said relation.

8. An oscillation generator comprising an electron discharge device having an anode, a cathode and a grid, a tuned oscillatory natural frequency determining circuit coupled between said grid and cathode, a transformer one winding of which is coupled to said grid and cathode and another winding of which is coupled to a source of constant frequency oscillations, a feed back circuit between said anode and said tuned oscillatory circuit, an output circuit for said generator, and connections extending from said output circuit to the last winding of said transformer for applying thereto a potential derived from said output circuit to control the effectiveness of said source of constant frequency oscillations in accordance with the departure of said oscillator from its natural frequency.

9. In combination, an electron discharge device generator, a source of control frequency voltage, means for obtaining from the output of said generator a voltage which is colinear in phase with the control frequency voltage at a predetermined frequency of said generator bearing a desired relation to the control frequency, but which departs from colinearity with departure of said generator from said predetermined frequency, means for combining said voltages with such relative polarity as to produce a resultant whose magnitude at said predetermined frequency of said generator is the difference between the magnitudes of the component voltages, whereby the resultant magnitude increases with departure of said generator from said predetermined frequency, and means for applying said resultant voltage to an electrode of said generator.

FRITZ KLAIBER.